United States Patent
Flaxman

(10) Patent No.: US 6,810,889 B2
(45) Date of Patent: Nov. 2, 2004

(54) VEHICLE WASHING APPARATUS

(75) Inventor: Michael Flaxman, Harrison, NY (US)

(73) Assignee: Hercules Systems, Inc., Huntington Station, NY (US)

(*) Notice: Subject to any disclaimer, the term of this patent is extended or adjusted under 35 U.S.C. 154(b) by 117 days.

(21) Appl. No.: 10/121,245

(22) Filed: Apr. 12, 2002

(65) Prior Publication Data
US 2002/0148490 A1 Oct. 17, 2002

Related U.S. Application Data
(60) Provisional application No. 60/284,044, filed on Apr. 16, 2001.

(51) Int. Cl.$^7$ ................................................ B08B 3/02
(52) U.S. Cl. ...................................... 134/123; 134/172
(58) Field of Search .............................. 134/34, 36, 45, 134/123, 172, 174

(56) References Cited
U.S. PATENT DOCUMENTS 2,689,577 A * 9/1954 Dunn et al. .................. 134/123
3,324,868 A * 6/1967 Kaufman ..................... 134/123
3,650,281 A * 3/1972 Hurst ........................ 134/58 R
3,726,293 A * 4/1973 Padek .......................... 134/45
4,303,087 A * 12/1981 Flaxman ................... 134/58 R
4,750,504 A   6/1988 Flaxman ..................... 134/123
4,809,720 A * 3/1989 Heraty ......................... 134/45
6,237,614 B1 * 5/2001 Retter ....................... 134/99.1

* cited by examiner

Primary Examiner—Frankie L. Stinson
Assistant Examiner—Joseph Perrin
(74) Attorney, Agent, or Firm—Ladas & Parry

(57) ABSTRACT

A vehicle washing apparatus having a frame suspended from the ceiling and adapted for encircling a vehicle, the frame being capable of being raised and lowered with respect to the vehicle and provided with nozzles for ejecting fluid against the vehicle to clean the vehicle. A pair of overhead bars extend transversely of the vehicle and are supported for traveling longitudinally with respect to the vehicle, the overhead bars being provided with nozzles for ejecting fluid onto the top of the vehicle. The overhead bars are movable towards and away from one another to wash the entire top of the vehicle.

27 Claims, 4 Drawing Sheets

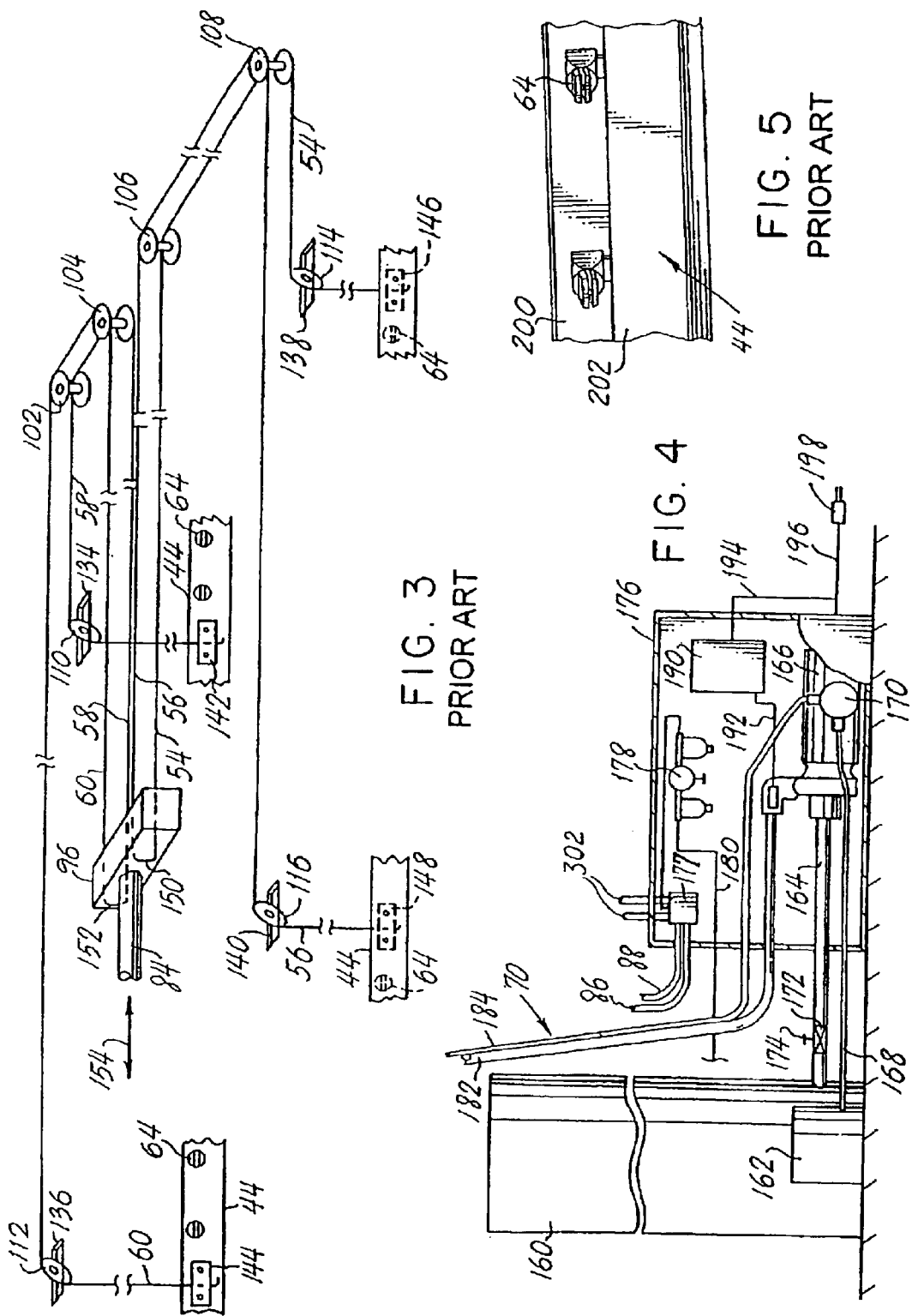

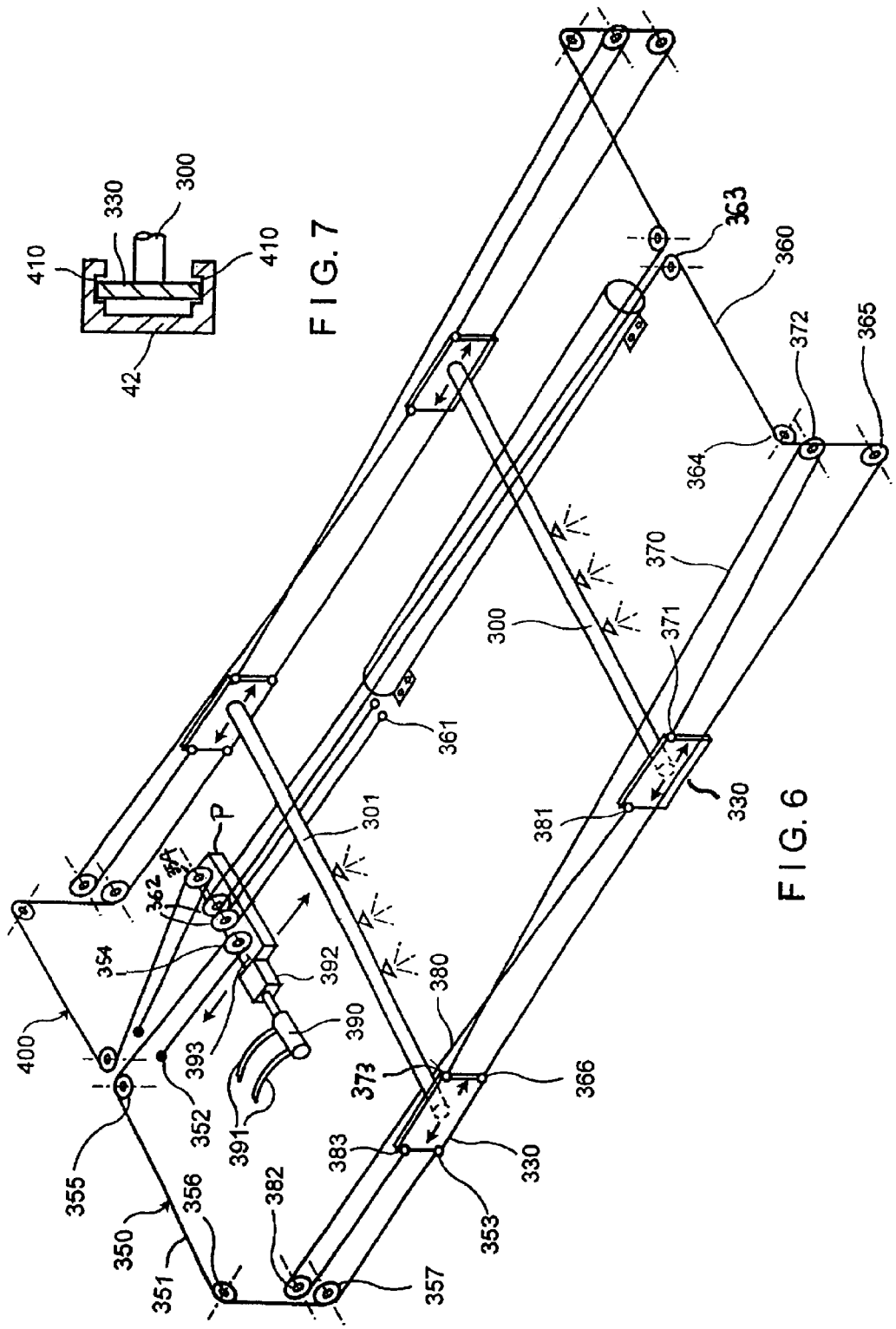

VEHICLE WASHING APPARATUS

This application claims the benefit of provisional application Ser. No. 60/284,044 filed Apr. 16, 2001.

FIELD OF THE INVENTION

The invention relates to improvements in vehicle washing apparatus.

BACKGROUND

In my earlier U.S. Pat. No. 4,750,504 there is disclosed vehicle washing apparatus which includes a frame for encircling a vehicle and ejecting cleaning fluid against the vehicle while the frame is lowered and raised with respect to the vehicle.

The apparatus has proved to be effective in cleaning the sides of the vehicle, but for trucks and new vehicle designs, the roofs of the vehicles may not be adequately cleaned and require manual cleaning.

SUMMARY OF THE INVENTION

An object of the invention is to provide a method and apparatus which avoids the disadvantage noted above and achieves thorough cleaning of the roofs of the vehicles automatically without any manual intervention.

A further effect of the invention is to reduce the time for cleaning the vehicle.

In accordance with the above and further objects of the invention, the vehicle washing apparatus comprises means for ejecting cleaning fluid against the roof and a vehicle in addition to the means for ejecting cleaning fluid against the sides of the vehicle.

More particularly, the vehicle washing apparatus comprises a frame adapted for encircling a vehicle, means for raising and lowering said frame with respect to the vehicle encircled by said frame, means for ejecting fluid from the frame against the vehicle to clean the vehicle, overhead bars supported above said vehicle for travel with respect to said vehicle and means for ejecting fluid from the overhead bar for cleaning the vehicle from above, as the bars travel with respect to the vehicle.

In further accordance with the invention, the overhead bars are comprised of first and second bars which are movable conjointly towards and away from each other.

In further accordance with the invention, the overhead bars extend transversely of the vehicle in a horizontal plane and are displaceable longitudinally of the vehicle.

In further accordance with the invention, said suspension means comprises fixed longitudinal members, said overhead bars including support elements at opposite ends of the bars mounted for displacement along said fixed longitudinal members, said support elements being connected by lines and pulleys to a drive means to produce said displacement thereof.

In further accordance with the invention, said lines are connected to said said support elements to move said overhead bars by the action of a piston-cylinder means.

In further accordance with the invention and said support elements each comprises a plate which is slidable with respect to said fixed longitudinal members.

In further accordance with the invention, said overhead bars are hollow and have discharge nozzles facing downwards towards said vehicle, fluid lines being connected to said overhead bars to eject cleaning fluid from the nozzles when the bars are moved longitudinally above the vehicle while said frame is raised and lowered with respect to the vehicle.

BRIEF DESCRIPTION OF THE DRAWING

FIG. 3 is a diagrammatic view illustrating the operation of a piston and cylinder arrangement employed in the apparatus of FIGS. 1 and 2;

FIG. 4 is a side view of a control apparatus, partially broken away and partially in section, the control apparatus controlling the supply of water and a cleaning agent to the apparatus of FIGS. 1 and 2;

FIG. 5 is a fragmentary view of a portion of a frame employed in FIGS. 1 and 2 to illustrate the mounting of nozzles, as in U.S. Pat. No. 4,750,504, for the purpose of spraying vehicles to be washed;

FIG. 6 is a perspective view diagrammatically illustrating a system for operating overhead bars of the vehicle washing apparatus of the invention; and FIG. 7 is a sectional view taken on lines 7—7 in FIG. 1.

DETAILED DESCRIPTION

Figure 1:
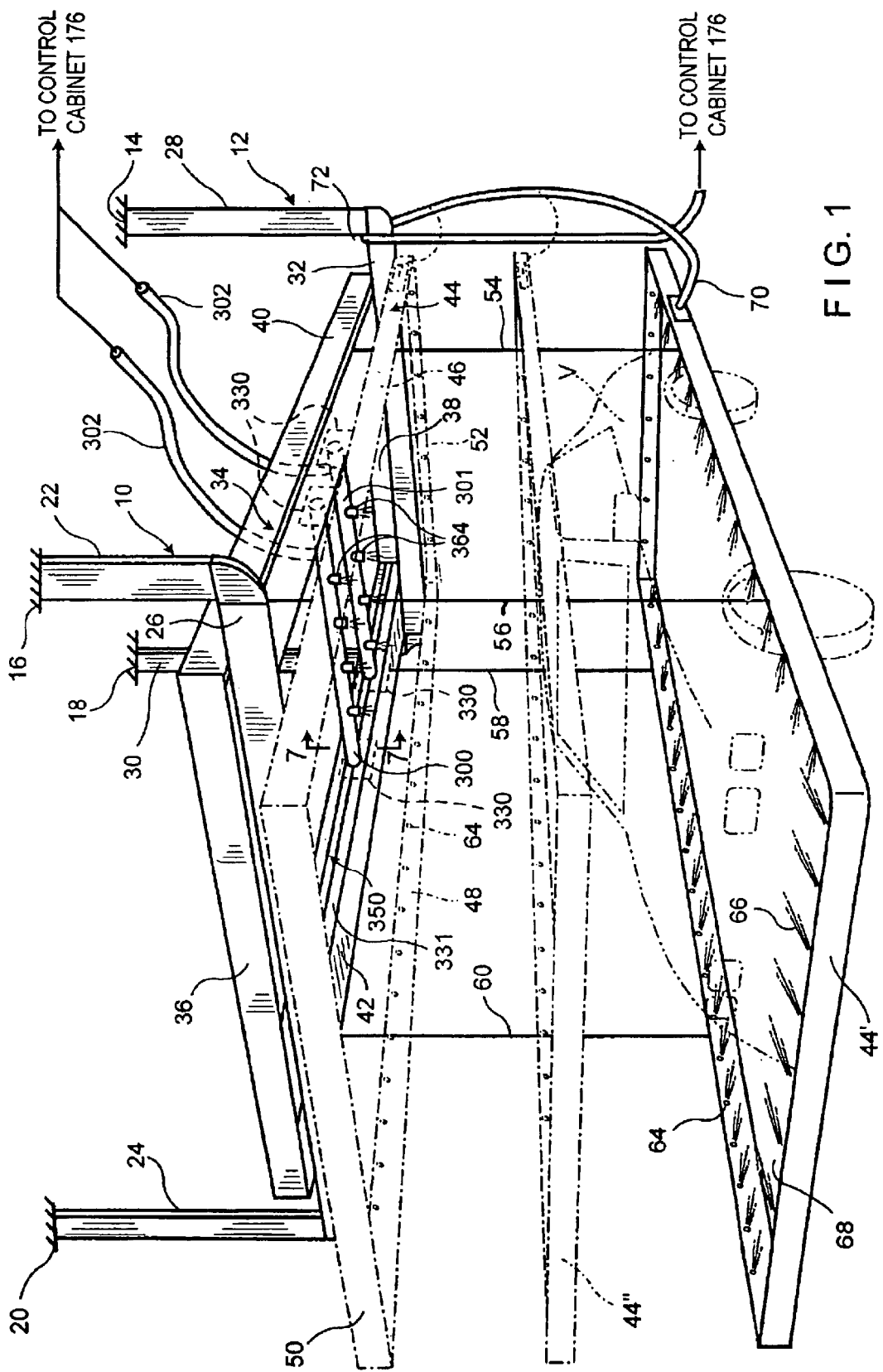
FIG. 1 is a perspective view of a vehicle washing apparatus provided in accordance with the invention, a vehicle to be washed being illustrated in phantom lines.

FIG. 1 illustrates vehicle washing apparatus comprising two U-shaped members or frames 10 and 12 respectively suspended from a ceiling, portions of which are indicated at 14, 16, 18 and 20. The U-shaped member 10 comprises vertical posts 22 and 24 connected by an intermediate bight portion 26. The U-shaped member 12 includes vertical posts 28 and connected by intermediate bight portion 32.

Suspended from the ceiling is a rectangular frame 34 including end sections 36 and 38 and side sections 40 and 42. Frame 34 rests upon the bight portions 26 and 32 of U-shaped members 10 and 12.

The apparatus includes a carwashing frame 44. Both the frame 44 and the frame 34 are of corresponding rectangular configuration and both are maintained in at least substantially horizontal attitude. The frame 44 includes sides 46 and 48 as well as ends 50 and 52. The vehicle washing frame 44 is shown in raised position. Its lowered position is shown at 44' and an intermediate position is illustrated at 44".

In order to control the raising and lowering of frame 44 with respect to vehicle V which is to be washed, there are connected to the frame 44 a plurality of lines or cables 54, 56, 58 and 60. These cables can be fabricated of wire or rope or the like as long as they are sufficiently strong to support the frame 44 and sufficiently flexible to be guided by a guiding system to be described hereinafter. The lines 54, 56, 58 and 60 are connected to rectangular frame 44 at spaced positions which are preferably located on the side sections 46 and 48 in order to hold the frame 44 in stabilized position.

As will be described subsequently, the frame 44 is provided at its interior with a plurality of nozzles 64 which direct jets or plumes 66 of fluid and cleaning agent inwardly towards the interior space 68 in which the vehicle V is located. These jets or plumes are directed against the vehicle and as the frame 44 is being raised and lowered, enable a cleaning of the vehicles by the force and action of the water and cleaning agent being directed thereagainst.

The frame 44 is connected to a conduit or pair of conduits 70 which are looped over the bight 32 as shown at 72. This conduit or pair of conduits is coupled to a control cabinet 176, which is to be discussed in greater detail later.

Mounted from the fixed frame 34 in a horizontal attitude are two transversely extending overhead bars 300, 301 for washing the vehicle V from above. For this purpose, the overhead bars 300, 301 are hollow and are connected by conduits 302 to control cabinet 176. The overhead bars 300,301 are provided with downwardly facing nozzles 64 extending in spaced relation along the length of the overhead bars for discharging jets or plumes of a mixture of water and cleaning fluid downwardly onto the roof or top of vehicle V thereby to achieve cleaning thereof. Any excess of the mixture will flow along the sides of the vehicle and will mix with fluid ejected from the nozzles of the frame 44.

The transverse bars 300, 301 are provided with respective plates 330 at their opposite ends which are guided for longitudinal movement in guides 331, in the form of slots, in the side sections 40 and 42 of the fixed frame 34. Any other guide means will be suitable provided they act to guide the longitudinal movement of the plates 330 with respect to the side sections 40, 42.

The plate 330 of the bars 330,301 at each of the side sections 40, 42 are connected to undergo conjoint travel towards and away from one another by a drive system 350 to be described in greater detail later.

Figure 2:
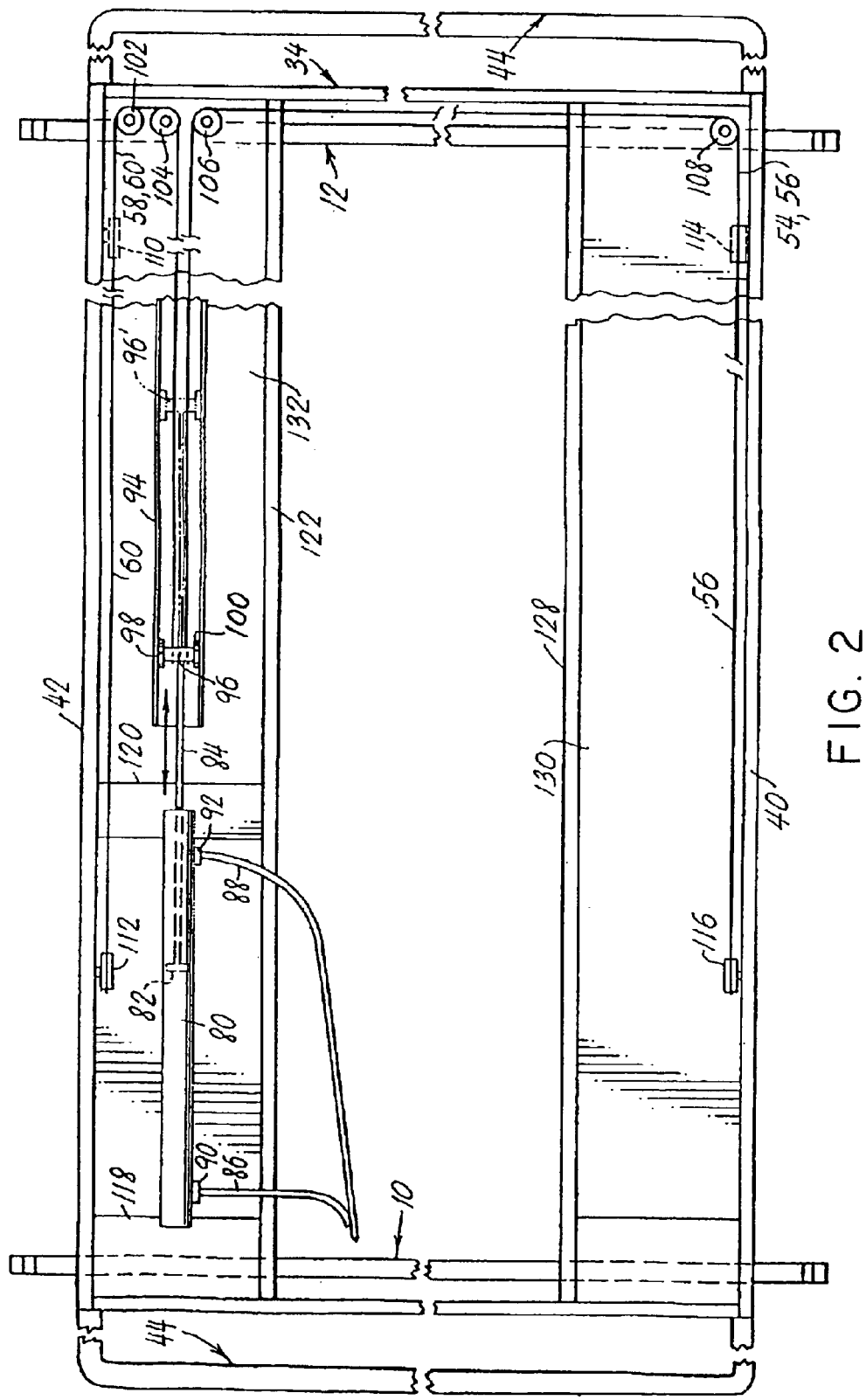
FIG. 2 is a top view of a vehicle washing frame employed in U.S. Pat. No. 4,750,504.

In FIG. 2 are illustrated a cylinder 80, a piston 82 and a piston rod 84. These elements are all in horizontal attitude. The piston 82 is accommodated within the cylinder 80 and is displaced by compressed air supplied by lines 86 and 88 connected at opposite ends of the cylinder 80 by means of fixtures 90 and 92. Compressed air is fed to lines 86 and 88 by an arrangement to be discussed hereinbelow.

Mounted in extension of the cylinder 80 is a U-shaped channel 94 within which is accommodated a yoke 96. The yoke 96 is connected to the free-end of piston rod 84. Wheels 98 and 100 are connected to opposite ends of the yoke 96 and are received in the U-shaped channel 94 to facilitate movement of the yoke therealong to a displaced position such as, for example, shown at 96'.

A plurality of lines are coupled to the yoke 96. As will be shown hereinafter, these lines are all parts of a single main line. The lines have been referred to hereinabove as lines 54, 56, 58 and 60. They are attached to various positions on the carwashing frame 44 whose raised or lowered position or positions are controlled by the playing out and retrieving of the various lines which in turn is controlled by the position of the yoke 96 under the control of the piston and cylinder arrangement 80, 82.

The lines are guided by a guiding system consisting of a plurality of pulleys or rollers preferably fabricated of Teflon or other suitable plastic adapted for constituting a relatively noise-free and effective guiding system. The system includes more particularly pulleys or rollers 102, 104, 106 and 108 having vertical axes and adapted for providing for a change of direction of the respective lines and a lateral displacement of the same in a horizontal plane. In addition, there are provided a further group of pulleys indicated at 110, 112, 114 and 116 having horizontal axes and intended for providing a change in direction of the respective lines such that these lines move from a horizontal attitude to a vertical attitude, thereby to suspend the carwashing frame 44.

It will be further seen in FIG. 2 that the frame 34 is provided with supports 118 and 120 mounted between side 42 and an interior element 122 extending longitudinally along the frame 44. Supports 118 and 120 provide a mounting for the cylinder 80 and firmly hold the same in position.

Operation of compressed air in the cylinder 80 displaces piston 82, thereby controlling the playing out of the various lines and the retrieving of the same. The weight of the frame 44 is adequate to hold the various lines fully extended or taut so that no entanglement of these lines can occur.

Also appearing in FIG. 2 is the longitudinally disposed member 128. Supported between this member and the side 40 of frame 34 is the sheet member 130. Similarly, a sheet member 132 is supported between side 42 and a longitudinally disposed member 122. It is in these sheet members that openings are provided for the lines passing around the various pulleys as next explained with reference to FIG. 3.

In FIG. 3 are illustrated the above-mentioned pulleys 102, 104, 106 and 108 as well as pulleys 110, 112, 114 and 116. These pulleys are disposed in openings 134, 136, 138 and 140 provided in the above-mentioned sheet members 130 and 132 (See FIG. 2).

Also seen in FIG. 3 are the attaching members 142, 144, 146 and 148 by means of which the free ends of the various lines 58, 60, 54 and 56 are attached to positions on the carwashing frame 44.

FIG. 3 illustrates that, as aforesaid, the lines 54, 56, 58 and 60 are guided for horizontal to vertical attitude. FIG. 3 moreover illustrates that these lines can be part of a single main line, the line 54 being connected to line 56 by means of bight 150 and the line 58 being connected to line 60 by bight 152. Thus, the lines are connected to the yoke 56 through which they extend in monolithic relationship with one another with the bights 150 and 152 holding the line sections attached to the yoke 96, the movement of which is indicated by double-headed arrow 154, this being controlled by operation of the piston and cylinder arrangement through the intermediary of piston rod 84 as has been discussed hereinabove.

As illustrated in FIG. 4, the cleaning system includes a tank 160 for storing and dispensing water and a tank 162 for storing and dispensing a cleaning agent such soap or the like. Tank 160 is connected via conduit 164 to water pump 166. Tank as liquid is connected via conduit 168 to a liquid soap pump 170. Valve 172 with a control handle 174 is provided in conduit 164.

The bulk of the controls are contained in control cabinet 176 from which extend lines 86 and 88, as aforesaid, to the cylinder 80 (see FIG. 2). These compressed air lines 86 and 88 are attached to an air valve 177, in turn connected to a regulator 178, in turn coupled via a line 180 to a source of compressed air (not shown).

Conduit 70 for supplying water and cleaning agent to the frame 44 are shown in FIG. 4 as consisting of respective lines 182 and 184. These lines carry water and fluid cleaning agent respectively to the frame 44, whereat they are dispensed through nozzles 64 in jets or plumes directed against the vehicle to be washed.

The apparatus further comprises a timer 190 housed within the control cabinet and connected via a line 192 to the pump 166 to control operation of the same. Operation of the pump 166 simultaneously controls operation of the soap pump 170. Power is supplied to the timer and the pumps by means of electrical lines 194 and 196 connected to a source of electrical power by a plug 198 of conventional type.

FIG. 5 illustrates a section of frame 44 defining therein a channel 200 within which is accommodated nozzles 64. The nozzles 64 are of such a length as to be accommodated within the depth of the channel 200 to be protected thereby. The frame 44 moreover defines a housing 202 within which pass the lines coupling the lines 182 and 184 to the nozzles 64 for the direction of water and cleaning agent against the vehicle V.

The relatively large horsepower pump 166 integrates with the soap pump 170 dispensing chemical cleaners automatically into the system. The frames which have been mentioned hereinabove are preferably formed of anodized aluminum material which is extra strong and will not rust. The nozzles 64 mentioned hereinabove are brass nozzles of a design to provide increased water flow and stronger spray patterns then heretofore available. The Teflon rollers mentioned hereinabove are relatively noise-free and provide for lowering the carwashing frame 44 quietly and smoothly.

FIG. 6 illustrates the details of system 350 for moving the plates 330 at the ends of the overhead bars 300, 301. The system 350 is similar to that described for raising and lowering frame 44 in that system 350 employs lines, pulleys and a piston-cylinder drive. Namely, system 350 includes a line 351 having one end 352 fixed to the fixed frame 34 shown) and an opposite end 353 fixed to a plate 330. The line 351 extends from fixed end 352 around a drive pulley 354 with a horizontal axis, then around a pulley 355 with a vertical axis, whereafter the line 351 extends around a pulley 356 having a horizontal axis wherefrom the line extends downwardly around a pulley 357 and then to its end 353 secured to plate 330. The system 350 further includes a second line 360 having a fixed end 361 from which the line 360 passes on a second drive pulley 362 to travel in reverse to a pulley 363 having a vertical axis of rotation. The line 360 then passes on a pulley 364 having a horizontal axis to a pulley 365 having a horizontal axis perpendicular to the axis of pulley 364 and wherefrom the line extends to a fixed point 366 on plate 330 attached to overhead bar 301.

The system 350 further includes a line 370 having one end 371 fixed to plate 330 of the other overhead bar 300. The line 370 extends from fixed end 371 around a pulley 372 having a horizontal axis to a fixed point 373 on plate 330 connected to overhead bar 301.

The system 350 further includes a line 380 which has one end 381 fixed to plate 330 on overhead bar 300 and which passes around a pulley 382 having a horizontal axis to a point 383 on plate 330 of overhead bar 301.

The system 350 also includes a piston-cylinder arrangement 390 similar to the piston-cylinder arrangement 80, 82 previously described. The cylinder of the piston-cylinder arrangement 390 is connected by flexible lines 391 to regulator 178 connected to the compressed air supply (not shown). The piston rod of the piston-cylinder arrangement is connected to a gear device 392 of conventional design which converts linear movement of the piston rod into rotary movement of an output shaft 393. The drive pulleys 354 and 362 are fixed to output shaft 364 to undergo rotation when the piston rod is displaced.

The pulleys 354, 362 and the piston-cylinder arrangement are mounted as a drive unit on a mobile platform P supported on the frame 34 (not shown) for travel longitudinally in opposite directions as indicated by the double headed arrow.

It is to be noted that lines 351 and 360 pass around respective drive pulleys 354 and 362 in opposite directions which provides a balanced system whereby depending on the direction of rotation of the output shaft 393 the plates 330 will be respectively moved towards or away from one another. In particular, for a clockwise rotation of the drive pulleys, line 351 pulls plate 330 on bar 301 rearwards in FIG. 6 while line 360 is played out and line 370 is tensioned and pulls plate 330 on bar 300 forwardly in FIG. 6 in synchronism with the plate 330 on bar 301 while line 380 is played out. The platform P supporting the drive unit concurrently moves forwards. For a counterclockwise rotation of output shaft 393, line 360 is tensioned to pull plate 330 on bar 301 in a forwards direction while line 380 pulls plate 330 on bar 300 rearwards towards the plate 330 on bar 301 in synchronism. Lines 351 and 370 are played out. The platform P moves rearwards.

The operation is as follows. When the piston rod is displaced so that the drive pulleys 354 and 362 rotate clockwise, forces are exerted on plates 330 attached to overhead bars 300, 301 to move the plates conjointly away from one another whereas when the drive pulleys 354 and 362 are rotated counterclockwise (by reverse displacement of the piston rod) the plates 330 move towards one another. A system 400 of lines and pulleys corresponding to system 350 is provided for concurrently moving the plates 330 at the opposite ends of the overhead bars whereby the bars move in synchronism towards and away from one another while maintaining a parallel relation transversely of the vehicle.

The drive pulleys of system 400 are mounted on platform P and are driven by the piston-cylinder arrangement 390 in concurrence with the drive pulleys 354, 362.

The regulator 178 controls the supply of compressed air to the piston-cylinder arrangement of the overhead bars and to the piston-cylinder 80, 82 controlling the operation of frame 44 so that the overhead bars are moved concurrently with the movement of frame 44. Thereby, the wash time of the vehicle is considerably shortened. A separate control means can be provided, if desired, to operate the movement of the frame 44 and the overhead bars 300, 301 separately.

In order to assure smooth travel of the plates 330, the plates are slidably fitted at the top and bottom edges thereof in slots 410 provided in the side sections 40, 42 of the frame 34. FIG. 7 is a section taken through side section 42 and therein can be seen plate 330 whose top and bottom edges are slidably fitted in slots 410 in upper and lower flanges of the side section 42. In an alternate arrangement, the plates 330 are slidable at the backfaces of the sections 40 and 42 and are connected to the overhead bars 330, 301 via longitudinal slots in the sections 40, 42.

As previously stated the drive pulleys 354 and 362 as well as the piston-cylinder arrangement 390 are supported for tracking movement as a unit when the piston-cylinder arrangement is actuated, whereas the other pulleys, which change direction of the lines, rotate about stationary axes. In the corresponding arrangement in the system 400 the drive pulleys travel together with the drive pulleys of system 350 while the line direction changing pulleys are stationary.

The supply of water and cleaning fluid to the overhead bars via conduits 302 and 303 is controlled by valves (not shown) which supply the water and cleaning fluid from tanks 160 and 162. These valves are located in control cabinet 176.

An automatic system may be provided in accordance with the invention so that as soon as frame 44 reaches hub cap level with respect to the vehicle V, the chemical pump begins to operate to eject water from frame 44 and the overhead bars 300, 301. An adjustment can be provided to compensate for regions of hard or soft water. Once the chemical pump is activated, the frame 44 rises and overhead bars traverse spraying water and preferably biodegradable chemical cleanser over the entire vehicle.

There will now be obvious to those skilled in the art, many modifications and variations of the apparatus set forth hereinabove. These modifications and variations will not depart from the scope of the invention of defined by the following claims.

What is claimed is:

1. Vehicle washing apparatus comprising:
   fixed support means,
   a frame adapted for encircling a vehicle,
   suspension means for raising and lowering said frame with respect to said fixed support means and with respect to the vehicle encircled by said frame,
   means for ejecting fluid from the frame against the vehicle to clean the vehicle,
   an overhead bar supported from said fixed support means above said vehicle for travel with respect to said vehicle, and
   means for ejecting fluid downwardly from the overhead bar for cleaning the vehicle from above,
   said fixed support means comprising transversely spaced fixed longitudinal members,
   said overhead bar having opposite ends and including support elements at said opposite ends mounted for displacement on and along said fixed longitudinal members, and
   a drive system for producing said displacement of said overhead bar along said fixed longitudinal members.

2. The apparatus of claim 1, comprising a second said overhead bar, the overhead bars facing one another and being connected so as to be movable towards and away from each other.

3. The apparatus of claim 2, wherein said overhead bars extend transversely of the fixed longitudinal members and are displaceable longitudinally of the vehicle in a horizontal plane thereabove.

4. The apparatus of claim 3, wherein said drive system for producing said displacement of said overhead bars comprises lines connected to said support elements to move said overhead bars conjointly.

5. The apparatus of claim 4, comprising pulleys supporting said lines and a piston-cylinder connected to said pulleys to move said lines and thereby move said overhead bars.

6. The apparatus of claim 5, wherein said support elements each comprises a plate which is slidable on a respective one of said fixed longitudinal members.

7. The apparatus of claim 6, wherein said lines are connected to opposite sides of said plates.

8. The apparatus of claim 5, wherein said overhead bars are hollow and have discharge nozzles facing downwards towards said vehicle, fluid lines being connected to said overhead bars to eject said fluid from the nozzles in the bars.

9. The apparatus of claim 8 wherein said lines connected to said support elements move said overhead bars longitudinally above the vehicle while said frame is raised and lowered with respect to the vehicle.

10. The apparatus of claim 9, wherein said fluid lines are connected to said fixed support means and to said frame to eject fluid from the overhead bars while the fluid is ejected from said frame.

11. In a vehicle washing apparatus having fixed support means, a frame adapted for encircling a vehicle, suspension means for raising and lowering said frame with respect to said fixed support means and with respect to the vehicle encircled by said frame, means for ejecting fluid from the frame against the vehicle to clean the vehicle,
   the improvement comprising:
      transversely spaced fixed longitudinal members supported by said fixed support means,
      an overhead bar having opposite ends and including support elements at said opposite ends mounted for displacement on and along said fixed longitudinal members,
      a drive system for producing said displacement of said overhead bar along said fixed longitudinal members, and
      means for ejecting fluid from the overhead bar for cleaning the vehicle from above.

12. The improvement of claim 11, comprising a second overhead bar, the two bars being movable towards and away from each other.

13. The improvement of claim 12, wherein said bars extend transversely of the fixed longitudinal members and are displaceable longitudinally of the vehicle in a horizontal plane thereabove.

14. The improvement of claim 12, wherein said means drive system for producing said displacement of said overhead bars comprises lines connected to said support elements to move said overhead bars conjointly.

15. The improvement of claim 14, comprising pulleys supporting said lines and a piston-cylinder connected to said pulleys to move said lines and thereby move said overhead bars.

16. The improvement of claim 15, wherein said support elements each comprises a plate which is slidable on a respective one of said fixed longitudinal members.

17. The improvement of claim 15, wherein said lines are connected to opposite sides of said plates.

18. The improvement of claim 12, wherein said overhead bars are hollow and have discharge nozzles facing downwards towards said vehicle, fluid lines being connected to said overhead bars to eject said fluid from the nozzles in the bars.

19. Car washing apparatus comprising:
   a fixed frame supported above a location for a vehicle to be washed,
   a pair of overhead bars supported by said fixed frame above the vehicle to be washed,
   said fixed frame comprising transversely spaced fixed longitudinal members,
   said bars extending transversely above the vehicle,
   said bars having opposite ends and including support elements at said opposite ends mounted for displacement on and along said fixed longitudinal members,
   nozzles for ejecting a fluid from the overhead bars onto the vehicle to clean the vehicle, and
   means for moving the overhead bars in synchronism towards and away from one another so that the bars traverse the vehicle.

20. The apparatus of claim 19, wherein said means for moving the bars comprises a system including lines and pulleys and a drive for said pulleys.

21. The apparatus of claim 20, wherein said lines are connected to move said ends of the pair of bars conjointly towards or away from one another.

22. The apparatus of claim 21, wherein the bars at each of its ends is connected by a system of said lines to displace said ends, said system of said lines including a first line looped around a first drive pulley, a second line looped in opposite direction around a second drive pulley, said first and second lines each having a fixed first end and a second end connected to an end of one of the bars, third and fourth lines connecting said ends of the pair of bars together, said drive of the bars to move towards or away from one another depending on the direction of including means for driving said drive pulleys in rotation together, to cause said ends of said drive pulleys.

23. The apparatus of claim 22, wherein said third and fourth lines looped in opposite directions around respective said pulleys.

24. The apparatus of claim 23, couipnsing a moveable platform supporting said drive.

25. The apparatus of claim 19, wherein said support elements at the ends of the bars are slidably supported by said fixed longitudinal members for travel in a horizontal plane.

26. The apparatus of claim 19, wherein said fixed longitudinal members have slots in which said support elements at the ends of the bars are supported for longitudinal travel along said fixed longitudinal members.

27. The apparatus of claim 26, wherein said support elements comprise plates.

* * * * *